US010320252B2

(12) United States Patent
Shimomura et al.

(10) Patent No.: US 10,320,252 B2
(45) Date of Patent: Jun. 11, 2019

(54) ROTARY ELECTRIC MACHINE (71) Applicant: Mitsubishi Electric Corporation, Tokyo (JP)

(72) Inventors: Ryuichi Shimomura, Tokyo (JP); Tomoki Sagayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 15/513,613

(22) PCT Filed: Nov. 10, 2014

(86) PCT No.: PCT/JP2014/079711
§ 371 (c)(1),
(2) Date: Mar. 23, 2017

(87) PCT Pub. No.: WO2016/075739
PCT Pub. Date: May 19, 2016

(65) Prior Publication Data
US 2018/0233975 A1    Aug. 16, 2018

(51) Int. Cl.
*H02K 1/30* (2006.01)
*B60K 6/28* (2007.10)
(Continued)

(52) U.S. Cl.
CPC ............ *H02K 1/30* (2013.01); *B60K 6/28* (2013.01); *B60K 6/40* (2013.01); *H02K 1/274* (2013.01);
(Continued)

(58) Field of Classification Search
CPC .......... H02K 1/30; H02K 1/27; H02K 1/274; H02K 1/2706; H02K 1/28; H02K 7/075; H02K 7/003
See application file for complete search history.

(56) References Cited

U.S. PATENT DOCUMENTS 765,078 A * 7/1904 Jigouzo ................ 310/59
6,097,125 A * 8/2000 Park .................. H02K 1/34
310/12.16
(Continued)

FOREIGN PATENT DOCUMENTS

JP    2003-063261 A    3/2003
JP    2003-070207 A    3/2003
(Continued)

OTHER PUBLICATIONS

International Search Report for PCT/JP2014/079711 dated Jan. 20, 2015 [PCT/ISA/210].
Written Opinion for PCT/JP2014/079711 dated Jan. 20, 2015 [PCT/ISA/237].

*Primary Examiner* — Dang D Le
(74) *Attorney, Agent, or Firm* — Sughrue Mion, PLLC; Richard C. Turner (57) ABSTRACT

The rotor of the rotary electric machine according to the present invention includes: a cylindrical rotor core; magnets that are respectively housed in a plurality of magnet housing apertures that are formed circumferentially so as to pass axially through an outer circumferential side of the rotor core; and a rotor boss that includes: a cylindrical rotor ring that holds the rotor core; an annular mounting portion that is linked to the crankshaft so as to be disposed coaxially at a first axial end inside the rotor ring; and a linking plate that links the rotor ring and the mounting portion, and the linking plate is formed so as to have a curved shape that is convex toward a second axial end of the rotor boss, and has a thickness that reduces continuously from a radially inner side toward a radially outer side.

6 Claims, 3 Drawing Sheets (51) Int. Cl.
  *H02K 7/18*    (2006.01)
  *H02K 7/00*    (2006.01)
  *H02K 11/21*   (2016.01)
  *B60K 6/40*    (2007.10)
  *H02K 1/27*    (2006.01)
  *H02K 7/075*   (2006.01)
  *H02K 15/03*   (2006.01)
  *H02K 51/00*   (2006.01)

(52) U.S. Cl.
  CPC .............. *H02K 7/006* (2013.01); *H02K 7/075* (2013.01); *H02K 7/18* (2013.01); *H02K 11/21* (2016.01); *H02K 15/03* (2013.01); *H02K 51/00* (2013.01); *B60Y 2200/92* (2013.01); *B60Y 2400/608* (2013.01); *Y10S 903/906* (2013.01)

(56) References Cited

U.S. PATENT DOCUMENTS

| | | | |
|---|---|---|---|
| 2002/0053838 A1* | 5/2002 | Okuda | F02N 11/04 310/59 |
| 2006/0103253 A1* | 5/2006 | Shiga | H02K 1/2786 310/156.45 |
| 2011/0006545 A1 | 1/2011 | Himmelmann | |

FOREIGN PATENT DOCUMENTS

| | | |
|---|---|---|
| JP | 2004-236440 A | 8/2004 |
| JP | 2011-019391 A | 1/2011 |
| JP | 2011-254663 A | 12/2011 |
| JP | 2013-132115 A | 7/2013 |

* cited by examiner

FIG. 6

ROTARY ELECTRIC MACHINE

CROSS REFERENCE TO RELATED APPLICATIONS

This application is a National Stage of International Application No. PCT/JP2014/079711 filed Nov. 10, 2014, the contents of all of which are incorporated herein by reference in their entirety.

TECHNICAL FIELD

The present invention relates to a rotary electric machine that is disposed in series with a torque converter between a crankshaft of an engine and a main shaft of a transmission, and that transmits mechanical power from the engine to the transmission, and particularly relates to a rotor boss construction that can achieve reductions in rigidity and dispersion of stress in a rotor boss.

BACKGROUND ART

In conventional hybrid vehicle mechanical power transmitting apparatuses, a motor-generator and a torque converter are connected in series between a crankshaft of an engine and a main shaft of a transmission, and charge a battery and perform energy recovery by regenerative braking by making the motor-generator function as a generator, and start the engine and assist engine power by making the motor-generator function as a motor (see Patent Literature 1, for example).

However, in the conventional hybrid vehicle mechanical power transmitting apparatus that is described in Patent Literature 1, because the engine, the motor-generator, and the torque converter are disposed in series in a straight line, the direct distance from the engine to the torque converter is long. Thus, loads that act on the torque converter that originate from the engine, particularly the loads of bending moments, are increased, and there has been a risk that the torque converter may be damaged.

In consideration of such conditions, conventional hybrid vehicle mechanical power transmitting apparatuses have been proposed in which a torque converter is housed inside a rotor of a motor-generator (see Patent Literature 2, for example). In the conventional hybrid vehicle mechanical power transmitting apparatus that is described in this Patent Literature 2, because the direct distance from the engine to the torque converter can be shortened, loads that act on the torque converter that originate from the engine are reduced, suppressing occurrences of damage to the torque converter.

CITATION LIST

Patent Literature

Patent Literature 1: Japanese Patent Laid-Open No. HEI 5-30605 (Gazette)
Patent Literature 2: Japanese Patent Laid-Open No. 2003-70207 (Gazette)

SUMMARY OF THE INVENTION

Problem to be Solved by the Invention

However, in the conventional hybrid vehicle mechanical power transmitting apparatus that is described in Patent Literature 2, because the torque converter is housed inside the rotor of the motor-generator, one problem has been that radial dimensions of the rotor are increased, increasing the size of the motor-generator.

The present invention aims to solve the above problems and an object of the present invention is to provide a rotary electric machine that can suppress occurrence of damage to a torque converter while suppressing increases in radial dimensions of a rotor in a configuration in which the rotor and the torque converter are disposed in series between a crankshaft of an engine and a main shaft of a transmission by absorbing loads that originate from the engine using a rotor boss to reduce loads that act on the torque converter.

Means for Solving the Problem

A rotary electric machine according to the present invention includes a rotor that is linked to a crankshaft of an engine so as to be driven to rotate by mechanical power from the engine. The rotor includes: a cylindrical rotor core that is produced so as to have a cylindrical shape by laminating electromagnetic steel sheets; magnets that are respectively housed in a plurality of magnet housing apertures that are formed circumferentially so as to pass axially through an outer circumferential side of the rotor core, the magnets being fixed to the rotor core using an adhesive; and a rotor boss that includes: a cylindrical rotor ring that holds the rotor core; an annular mounting portion that is linked to the crankshaft so as to be disposed coaxially at a first axial end inside the rotor ring; and a linking plate that links the rotor ring and the mounting portion, and the linking plate is formed so as to have a curved shape that is convex toward a first axial end or a second axial end of the rotor boss, and has a thickness that reduces continuously or discontinuously from a radially inner side toward a radially outer side or from the radially outer side toward the radially inner side.

Effects of the Invention

According to the present invention, because the thickness of the linking plate reduces continuously or discontinuously from the radially inner side to the radially outer side or from the radially outer side to the radially inner side, a side of the linking plate near the rotor ring or a side near the mounting portion constitutes a thinnest portion. When loads that originate from the engine act on the rotor boss, the thinnest portion of the linking plate deforms and absorbs the loads in question. Thus, if the rotor of the present rotary electric machine and a torque converter are disposed in series between the crankshaft of the engine and a main shaft of a transmission, then the loads that originate from the engine are absorbed by the deformation of the thinnest portion of the linking plate, reducing the loads that are transmitted to the torque converter side. Thus, it is not necessary to house the torque converter inside the rotor, enabling increases in outside diameter dimensions of the rotor to be suppressed.

Because the linking plate is formed so as to have a curved shape that is convex toward the first axial end or the second end of the rotor boss, stresses that are concentrated at a linking portion between the linking plate and the rotor ring, and at a linking portion between the linking plate and the mounting portion, are dispersed, enabling fatigue strength to be increased.

DESCRIPTION OF EMBODIMENTS

Preferred embodiments of a rotary electric machine according to the present invention will now be explained with reference to the drawings.

Embodiment 1

Figure 1:
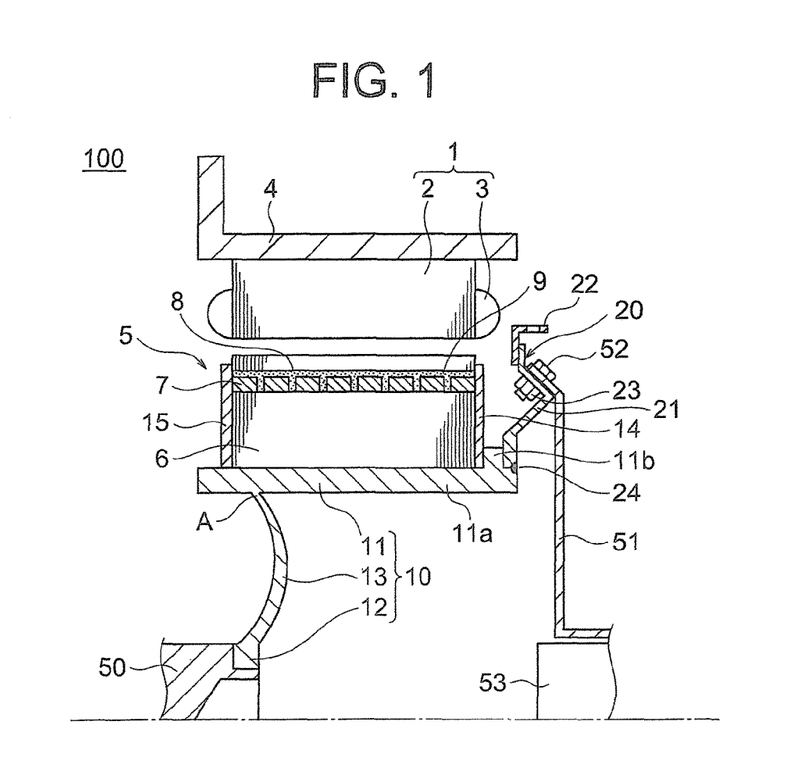
FIG. 1 is a half section that shows a motor-generator according to Embodiment 1 of the present invention.
Figure 2:
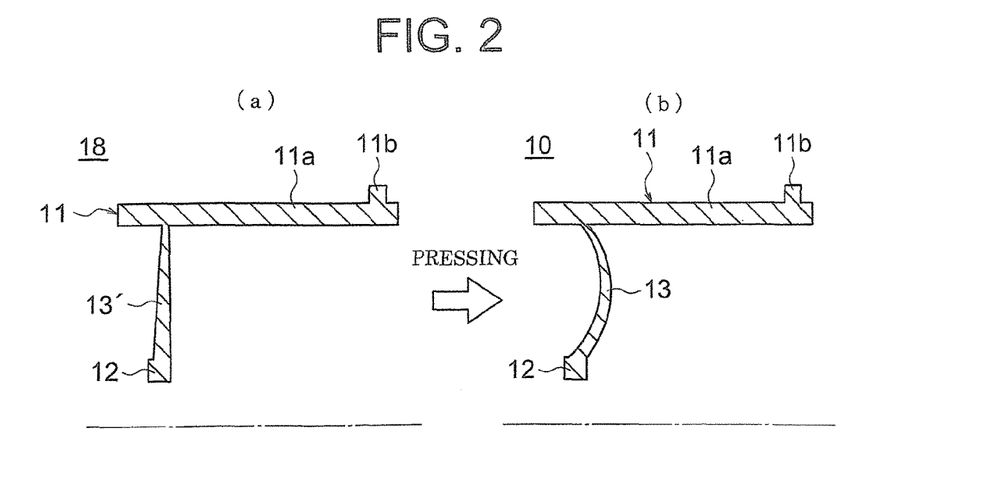
FIG. 2 is a diagram that explains a manufacturing method for a rotor boss in the motor-generator according to Embodiment 1 of the present invention.

FIG. 1 is a half section that shows a motor-generator according to Embodiment 1 of the present invention, and FIG. 2 is a diagram that explains a manufacturing method for a rotor boss in the motor-generator according to Embodiment 1 of the present invention.

In FIG. 1, a motor-generator 100 that functions as a rotary electric machine includes: a stator 1; a rotor 5 that is disposed inside the stator 1 so as to be coaxial to the stator 1; and a sensor portion 20 that detects rotational speed of the rotor 5.

The stator 1 includes: an annular stator core 2; and a stator coil 3 that is mounted to the stator core 2. The stator core 2 is produced by laminating and integrating electromagnetic steel sheets, and is inserted into a cylindrical iron frame 4 so as to be held by press-fitting or shrinkage fitting.

The rotor 5 includes: a cylindrical rotor core 6 that is smaller in diameter than the stator core 2; permanent magnets 7 that are mounted to the rotor core 6 so as to form magnetic poles; and a rotor boss 10 that holds the rotor core 6. The rotor core 6 is produced by laminating and integrating electromagnetic steel sheets that have been punched into an annular shape. A plurality of magnet housing apertures 8 are each formed in the rotor core 6 at a uniform angular pitch circumferentially so as to pass through the rotor core 6 axially. The permanent magnets 7 are inserted into each of the magnet housing apertures 8, and are fixed to the rotor core 6 using an adhesive 9.

The rotor boss 10 is produced using a ferrous material, and includes: a cylindrical rotor ring 11 that holds the rotor core 6; an annular mounting portion 12 that is disposed coaxially inside a first axial end of the rotor ring 11, and that is fastened to a crankshaft 50 by bolts; and a linking plate 13 that is formed so as to extend radially outward from a second end edge portion of the mounting portion 12 to a first end of an inner circumferential surface of the rotor ring 11, and that links rotor ring 11 and the mounting portion 12.

The rotor ring 11 includes: a cylindrical portion 11a that has a constant thickness, such as a thickness of 4 mm, for example; and a positioning flange portion 11b that is formed so as to protrude radially outward around an entire circumference at a second end of an outer circumferential surface of the cylindrical portion 11a. A cross-sectional shape of the linking plate 13 that includes a central axis of the rotor boss 10 is a curved shape that is convex toward a second axial end of the rotor boss 10, and a thickness thereof reduces continuously from a radially inner side toward a radially outer side. Specifically, the cross-sectional shape of the linking plate 13 that includes the central axis of the rotor boss 10 is a circular arc shape that is bounded by a circular arc that has a first radius of curvature and a circular arc that has a second radius of curvature that is greater than the first radius of curvature, and an end thereof near the rotor ring 11 is thinnest. Here, a thickness at a thinnest portion A is less than 4 mm.

The sensor portion 20 includes: an annular sensor plate 21; and a sensor wheel 22 that is fixed to an outer circumferential portion of the sensor plate 21. A pressing nut 23 is press-fitted into and held by the sensor plate 21.

To assemble the rotor 5, the permanent magnets 7 are first inserted into each of the magnet housing apertures 8, and the permanent magnets 7 are fixed to the rotor core 6 using the adhesive 9. Next, end plates 14 and 15 that have been punched out of a nonmagnetic metal sheet into annular shapes that have an inside diameter that is equal to an inside diameter of the rotor core 6 are disposed on two axial ends of the rotor core 6, and the rotor core 6 is press-fitted onto the cylindrical portion 11a of the rotor ring 11 from a first axial end until the end plate 14 is placed in contact with the positioning flange portion 11b. The rotor 5 is assembled thereby. Next, the annular sensor plate 21 is mounted over the cylindrical portion 11a of the rotor ring 11 from a second axial end so as to come into contact with the positioning flange portion 11b, and is fixed to the rotor ring 11 by welding. Moreover, the number 24 indicates the weld portion.

In the rotor 5 that is assembled in this manner, the end plates 14 and 15 are produced so as to have outside diameter dimensions that cover the magnet housing apertures 8, and prevent scattering of the permanent magnets 7. The axial position of the rotor core 6 is also ensured with high precision by placing the end plate 14 in contact with the positioning flange portion 11b. In addition, circumferential movement and axial movement of the rotor core 6 are restricted by press-fitting the laminated body that includes the rotor core 6 and the end plates 14 and 15 over the cylindrical portion 11a of the rotor ring 11.

Moreover, if the ambient temperature of the motor-generator 100 becomes high, the press-fitting fixing force of the rotor core 6 and the end plates 14 and 15 is reduced, and there is a risk that the rotor core 6 and the end plates 14 and 15 may not be able to turn together with the rotor ring 11 during high-speed rotation of the rotor 5. Thus, it is desirable to restrict circumferential movement of the rotor core 6 reliably by forming key portions that protrude radially inward on an inner circumferential surface of the laminated body that includes the rotor core 6 and the end plates 14 and 15 so as to extend from the first axial end to the second axial end, recessing keyways that extend axially into an outer circumferential surface of the cylindrical portion 11a of the rotor ring 11, and fitting the key portions together with the keyways during press-fitting of the rotor core 6.

A manufacturing method for the rotor boss 10 will now be explained with reference to FIG. 2.

As shown in FIG. 2A, a rotor boss precursor 18 that includes: a rotor ring 11; a mounting portion 12; and a linking plate 13' that links a second end outer circumferential edge portion of the mounting portion 12 and a first end portion of an inner circumferential surface of the rotor ring 11, is first produced by machining a blank that has been produced by hot forging, for example. Moreover, the linking plate 13' is formed into a ring-shaped flat plate in which a thickness reduces continuously from a radially inner side to a radially outer side, is disposed so as to be perpendicular to a central axis of the rotor ring 11, and covers between the rotor ring 11 and the mounting portion 12. Next, as shown in FIG. 2B, the linking plate 13' is formed by press working so as to have a curved shape that is convex toward a second axial end of the rotor ring 11, to produce the rotor boss 10.

As shown in FIG. 1, the mounting portion 12 of the rotor boss 10 of this motor-generator 100 is fastened by bolts (not shown) to the crankshaft 50 of an engine (not shown). In addition, the torque converter 51 is fixed to the sensor plate 21 by fastened a bolt 52 to the pressing nut 23, to configure an automotive mechanical power transmitting apparatus. The rotor 5 and the torque converter 51 of the motor-generator 100 are thereby disposed in series rectilinearly between the crankshaft 50 of the engine and the main shaft 53 of a transmission.

In the mechanical power transmitting apparatus that is configured in this manner, when the engine is operated, mechanical power from the engine is inputted into the torque converter 51 by means of the crankshaft 50 and the rotor boss 10. Thus, the mechanical power of the engine is amplified by the converter operation of the torque converter 51, and is transferred to the main shaft 53 of the transmission. By making the motor-generator 100 function as a generator, a battery is charged, or energy recovery by regenerative braking is performed. By making the motor-generator 100 function as a motor, the engine is started, or engine output is assisted.

According to Embodiment 1, because the linking plate 13 is formed so as to have a circular arc-shaped cross section in which a thickness thereof reduces continuously from a radially inner side toward a radially outer side, a vicinity of a linking portion of the linking plate 13 with the cylindrical portion 11a of the rotor ring 11 becomes a low-rigidity thinnest portion A. Thus, when axial loads and bending moments that are generated inside cylinders of the engine during combustion act on the rotor boss 10 via the crankshaft 50, these loads that originate from the engine are not transmitted to the torque converter 51 because the thinnest portion A of the linking plate 13 deforms. In this manner, even if the rotor 5 and the torque converter 51 of the motor-generator 100 are disposed in series rectilinearly between the crankshaft 50 of the engine and the main shaft 53 of the transmission, loads that act on the torque converter 51 that originate from the engine can be reduced. Consequently, the need to house the torque converter 51 inside the rotor 5 is eliminated, enabling the radial dimensions of the rotor 5 to be reduced. The occurrence of damage to the torque converter 51 is also suppressed, enabling loss due to breakdown to be reduced.

Because the linking plate 13 is formed so as to have a curved shape that is convex toward the second axial end, in which thickness reduces continuously from a radially inner side to a radially outer side, stresses that are concentrated at linking portions between the linking plate 13 and the cylindrical portion 11a of the rotor ring 11 and linking portions between the linking plate 13 and the mounting portion 12 are dispersed. Specifically, stresses that are concentrated at a linking portion between a surface of the linking plate 13 that faces toward the first axial end and the cylindrical portion 11a of the rotor ring 11, a linking portion between a surface of the linking plate 13 that faces toward the second axial end and the cylindrical portion 11a of the rotor ring 11, a linking portion between a surface of the linking plate 13 that faces toward the first axial end and the mounting portion 12, and a linking portion between a surface of the linking plate 13 that faces toward the second axial end and the mounting portion 12 are dispersed. Thus, concentrations of stress at the linking portions between the linking plate 13 and the cylindrical portion 11a of the rotor ring 11 and the linking portions between the linking plate 13 and the mounting portion 12 are alleviated, enabling fatigue strength to be increased. Heat treatment of the thinnest portion A of the linking plate 13 is thereby no longer required, enabling processing costs of the rotor boss 10 to be reduced.

Moreover, in Embodiment 1 above, the rotor core 6 is press-fitted onto the cylindrical portion 11a of the rotor ring 11, but the rotor core 6 may be fitted loosely onto the cylindrical portion 11a of the rotor ring 11. In that case, it is necessary to restrict circumferential movement and axial movement of the rotor core 6. Methods for restricting the circumferential movement of the rotor core 6 include, for example, methods in which key portions that protrude radially inward on an inner circumferential surface of the laminated body that includes the rotor core 6 and the end plates 14 and 15 are formed so as to extend from the first axial end to the second axial end, keyways that extend axially are recessed into an outer circumferential surface of the cylindrical portion 11a of the rotor ring 11, and the key portions are fitted together with the keyways during press-fitting of the rotor core 6. Methods for restricting axial movement of the rotor core 6 include, for example, methods in which a first axial end of the rotor ring 11 is crimped. Here, the keyways may be formed on the inner circumferential surface of the laminated body that includes the rotor core 6 and the end plates 14 and 15, and key portions may be formed on the outer circumferential surface of the cylindrical portion 11a.

In Embodiment 1 above, the rotor core 6 is held on the cylindrical portion 11a of the rotor ring 11 by press fitting, but the rotor core 6 may be held on the cylindrical portion 11a of the rotor ring 11 by shrinkage fitting.

In Embodiment 1 above, the linking plate 13 is produced so as to have a curved shape by pressing, but the linking plate 13 may be produced so as to have a curved shape by cutting.

In Embodiment 1 above, the positioning flange portion 11b is formed on the outer circumferential surface of the cylindrical portion 11a continuously around a circumference of a common circle, but positioning flange portions may be formed on the outer circumferential surface of the cylindrical portion 11a discontinuously around the circumference of a common circle.

Embodiment 2

Figure 3:
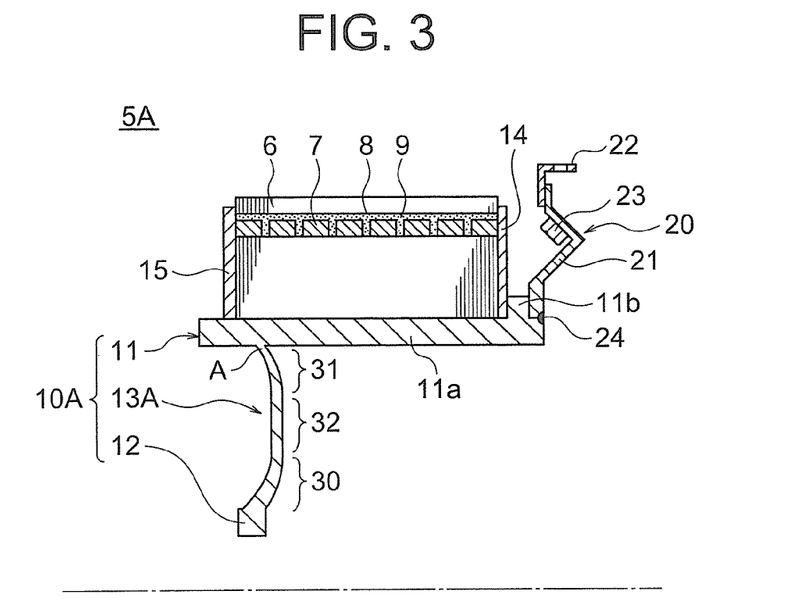
FIG. 3 is a half section that shows a rotor of a motor-generator according to Embodiment 2 of the present invention.

FIG. 3 is a half section that shows a rotor of a motor-generator according to Embodiment 2 of the present invention.

In FIG. 3, a rotor boss 10A includes: a rotor ring 11; a mounting portion 12; and a linking plate 13A that links the rotor ring 11 and the mounting portion 12. The linking plate 13A is formed so as to extend radially outward from a second end edge portion of the mounting portion 12 while thickness reduces continuously, and then to extend radially outward while maintaining the thickness, and subsequently to extend radially outward while thickness reduces continuously, to reach an inner circumferential surface of a cylindrical portion 11a of the rotor ring 11.

Moreover, the rest of the configuration is formed in a similar or identical manner to that of Embodiment 1 above.

The rotor 5A is configured in a similar or identical manner to the rotor 5 except that the rotor boss 10A is used instead of the rotor boss 10. The linking plate 13A of the rotor boss 10A is constituted by: a radially inner curved portion 30 that has a circular arc-shaped cross section in which thickness reduces continuously from a radially inner side to a radially outer side; a radially outer curved portion 31 that has a circular arc-shaped cross section in which thickness reduces continuously from a radially inner side to a radially outer side; and a ring-shaped flat plate portion 32 that has a constant thickness, that links the radially inner curved portion 30 and the radially outer curved portion 31. In other words, the thickness of the linking plate 13A reduces discontinuously from a radially inner side to a radially outer side. The ring-shaped flat plate portion 32 is perpendicular to a central axis of the rotor boss 10A. Furthermore, a thinnest portion A is on the radially outer curved portion 31 in a vicinity of the rotor ring 11. A cross-sectional shape of the linking plate 13A that includes a central axis of the rotor boss 10A is a curved shape that is convex toward a second axial end of the rotor boss 10A.

In Embodiment 2, the cross-sectional shape of the linking plate 13A that includes the central axis of the rotor boss 10A is a curved shape that is convex toward the second axial end of the rotor boss 10A, the thicknesses of the radially inner curved portion 30 and the radially outer curved portion 31 are formed so as to reduce continuously from the radially inner side to the radially outer side, and the thinnest portion A is on the radially outer curved portion 31 in a vicinity of the rotor ring 11. Consequently, similar or identical effects to those of Embodiment 1 above can also be achieved in Embodiment 2.

Now, there is reproducibility in the movement of the machining tool, and the shape (dimensions) of the radially inner curved portion 30 and the radially outer curved portion 31 of the linking plate 13A are fixed when the axial height of the linking plate 13A is determined. Since the radially inner curved portion 30 and the radially outer curved portion 31 of the linking plate 13A have curved shapes, the dimensions of the radially inner curved portion 30 and the radially outer curved portion 31 cannot be measured easily.

According to Embodiment 2, a radially central portion of the linking plate 13A is formed into a ring-shaped flat plate portion 32 that is perpendicular to the central axis of the rotor boss 10A. In other words, because the radially central portion of the linking plate 13A is a flat surface that is perpendicular to the central axis of the rotor boss 10A, axial height of the linking plate 13A from the rotor boss 10A can be measured easily and with high precision. The dimensions of the radially inner curved portion 30 and the radially outer curved portion 31 can also be managed by managing the axial height of the linking plate 13A from the rotor boss 10A. Thus, because steps for measuring the dimensions of the radially inner curved portion 30 and the radially outer curved portion 31, which are difficult to measure after formation of the rotor boss 10A, can be omitted, dimensional inspection costs are reduced, enabling reductions in cost of the rotor boss 10A to be achieved.

Embodiment 3

Figure 4:
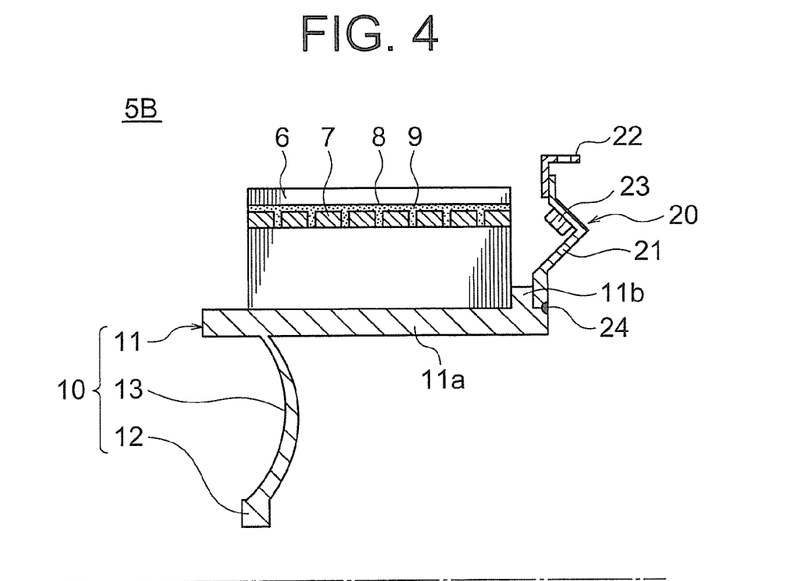
FIG. 4 is a half section that shows a rotor of a motor-generator according to Embodiment 3 of the present invention.

FIG. 4 is a half section that shows a rotor of a motor-generator according to Embodiment 3 of the present invention.

In FIG. 4, end plates 14 and 15 are omitted from a rotor 5B, and only a rotor core 6 is press-fitted over and held by a cylindrical portion 11a of a rotor ring 11.

Moreover, the rest of the configuration is formed in a similar or identical manner to that of Embodiment 1 above.

In Embodiment 3, because the rotor boss 10 is used, similar effects to those in Embodiment 1 above can also be achieved. Because the permanent magnets 7 are fixed to the rotor core 6 using the adhesive 9 in the rotor 5B, situations such as the permanent magnets 7 scattering during rotation of the rotor 5B are avoided.

According to Embodiment 3, end plates 14 and 15 are omitted, and only a rotor core 6 is held so as to be fitted over the cylindrical portion 11a of the rotor ring 11. Thus, because the number of parts is reduced, parts costs are reduced, and weight is also reduced, reducing inertia.

Embodiment 4

Figure 5:
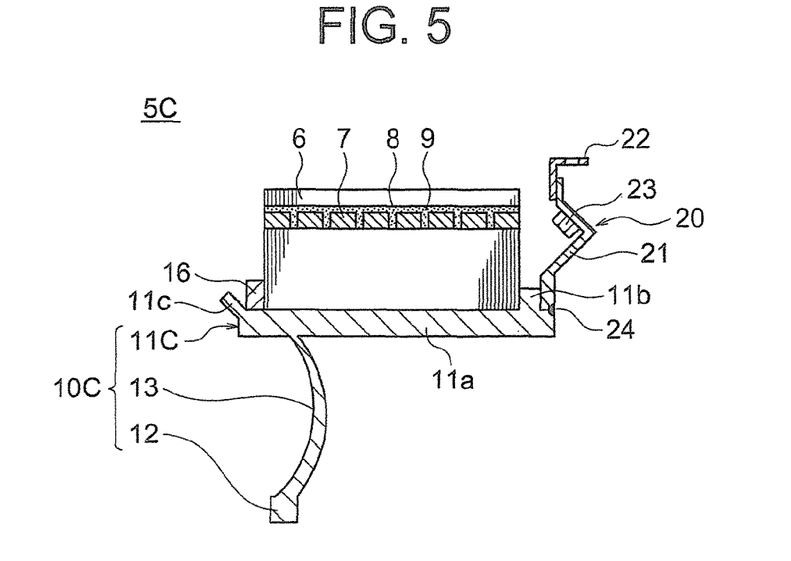
FIG. 5 is a half section that shows a rotor of a motor-generator according to Embodiment 4 of the present invention.

FIG. 5 is a half section that shows a rotor of a motor-generator according to Embodiment 4 of the present invention.

In FIG. 5, a rotor boss 10C includes: a rotor ring 11C; a mounting portion 12; and a linking plate 13 that links a first end portion of an inner circumferential surface of the rotor ring 11C and a second end outer circumferential edge portion of the mounting portion 12. The rotor ring 11C includes: a cylindrical portion 11a; a positioning flange portion 11b that is formed on a second side of an outer circumferential surface of the cylindrical portion 11a; a crimping flange portion 11c that functions as a crimping portion that is formed so as to have a cylindrical shape that has an outside diameter that is equal to the cylindrical portion 11a, and a thickness that is thinner than the cylindrical portion 11a, and that protrudes coaxially from a first end surface of the cylindrical portion 11a.

The rotor core 6 is press-fitted onto the cylindrical portion 11a of the rotor ring 11C from a first axial end until placed in contact with the positioning flange portion 11b. In addition, an end plate 16 that has an outside diameter dimension that does not cover the magnet housing apertures 8 is press-fitted onto the cylindrical portion 11a of the rotor ring 11C from a first axial end until placed in contact with a first axial end surface of the rotor core 6. In addition, the crimping flange portion 11c is crimped radially outward, to assemble a rotor 5C.

Moreover, the rest of the configuration is formed in a similar or identical manner to that of Embodiment 1 above.

In Embodiment 4, a crimping force from the crimping flange portion 11c acts so as to press the rotor core 6 against the positioning flange portion 11b by means of the end plate 16. The end plate 16 and the rotor core 6 are thereby pressed and held between the positioning flange portion 11b and the crimping flange portion 11c, firmly restricting axial movement of the rotor core 6. Because the permanent magnets 7 are fixed to the rotor core 6 using the adhesive 9 in the rotor 5C, situations such as the permanent magnets 7 scattering during rotation of the rotor 5C are avoided.

Now, if the end plate 16 is formed so as to have an outside diameter dimension that covers the magnet housing apertures 8, it is necessary to produce the end plate 16 using a nonmagnetic material. As a result thereof, thermal expansion coefficients of the end plate 16 and the rotor boss 10 are different, reducing the press-fitting fixing force of the end plate 16 if the ambient temperature increases.

In Embodiment 4, because the end plate 16 is formed so as to have an outside diameter dimension that does not cover the magnet housing apertures 8, the end plate 16 can be produced using a magnetic material that is similar or identical to that of the rotor boss 10C. Thus, the thermal expansion coefficients of the end plate 16 and the rotor boss 10 are identical, suppressing reductions in the press-fitting fixing force of the end plate 16 even if the ambient temperature increases.

Because the end plate 15 in Embodiment 1 above is omitted, and an end plate 16 that has a smaller outside diameter dimension is used instead of the end plate 14, reductions in parts costs can be achieved.

Moreover in Embodiment 4, circumferential movement of the rotor core 6 and the end plate 16 may also be restricted by forming key portions that protrude radially inward on an inner circumferential surface of the rotor core 6 and the end plate 16 so as to extend from the first axial end to the second axial end, recessing keyways that extend axially into an outer circumferential surface of the cylindrical portion 11a of the rotor ring 11, and fitting the key portions together with the keyways during press-fitting of the rotor core 6 and the end plate 16.

Embodiment 5

Figure 6:
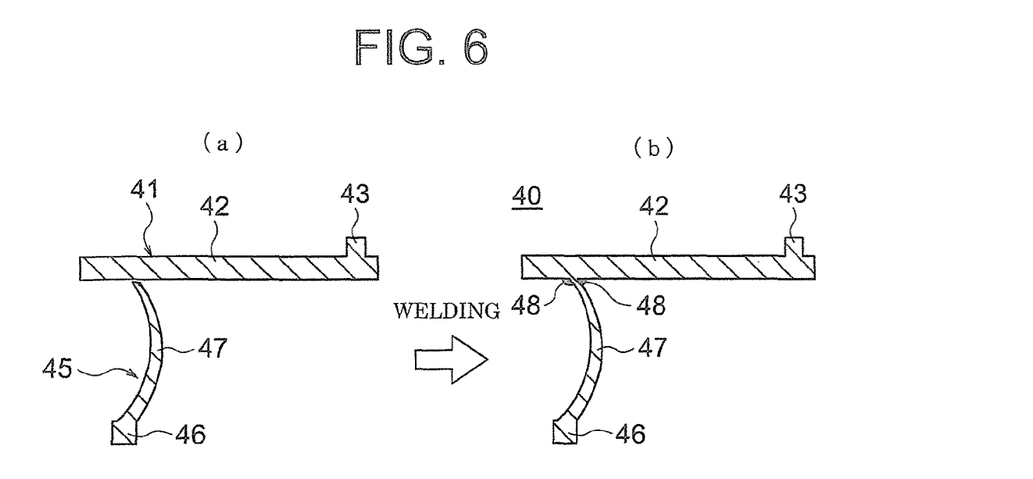
FIG. 6 is a diagram that explains a manufacturing method for a rotor boss that is used in a rotor of a motor-generator according to Embodiment 5 of the present invention.

FIG. 6 is a diagram that explains a manufacturing method for a rotor boss that is used in a rotor of a motor-generator according to Embodiment 5 of the present invention.

In a manufacturing method for a rotor boss according to Embodiment 5, as shown in FIG. 6A, a radially outer part 41 in which a positioning flange portion 43 is formed on a second axial end of an outer circumferential surface of a cylindrical portion 42, and a radially inner part 45 in which an annular mounting portion 46 is formed integrally on an inner circumferential edge of a linking plate 47 in which a ring-shaped flat plate that has a thickness that reduces continuously from a radially inner side to a radially outer side is formed so as to have a curved shape that is convex in a second axial direction, are first produced. Next, as shown in FIG. 6B, a rotor boss 40 is produced by joining an outer circumferential edge of the linking plate 47 to the first axial end of an inner circumferential surface of the cylindrical portion 42 by welding, to link the radially outer part 41 and the radially inner part 45. Moreover, the number 48 indicates the weld portion.

According to Embodiment 5, because a radially outer part 41 that corresponds to a rotor ring, and a radially inner part 45 in which a mounting portion 46 and a linking plate 47 are formed together, are prepared, and then a rotor boss 40 is produced by linking the radially outer part 41 and the radially inner part 45 by welding, options for methods for machining the cylindrical portion 42 (the rotor ring), the mounting portion 46, and the linking plate 47 are increased. Thus, an optimal machining method can be chosen for each of the parts, enabling reductions in cost to be achieved. Furthermore, a blank can be produced by roll forging instead of hot forging, increasing productivity, and also enabling materials yield to be increased.

Moreover, in each of the above embodiments, a linking plate is formed so as to have a thickness that reduces continuously from a radially inner side to a radially outer side, but a linking plate may be formed so as to have a thickness that reduces continuously from a radially outer side to a radially inner side.

In each of the above embodiments, a linking plate is formed so as to have a curved shape that is convex toward a second axial end of a rotor boss, but a linking plate may be formed so as to have a curved shape that is convex toward a first axial end of a rotor boss.

The invention claimed is:

1. A rotary electric machine comprising a rotor that is linked to a crankshaft of an engine so as to be driven to rotate by mechanical power from said engine, wherein:
    said rotor includes:
        a cylindrical rotor core that is produced so as to have a cylindrical shape by laminating electromagnetic steel sheets;
        magnets that are respectively housed in a plurality of magnet housing apertures that are formed circumferentially so as to pass axially through an outer circumferential side of said rotor core, said magnets being fixed to said rotor core using an adhesive; and
        a rotor boss that includes:
            a cylindrical rotor ring that holds said rotor core;
            an annular mounting portion that is linked to said crankshaft so as to be disposed coaxially at a first axial end inside said rotor ring; and
            a linking plate that links said rotor ring and said mounting portion; and
        said linking plate is formed so as to have a curved shape that is convex toward a first axial end or a second axial end of said rotor boss, and has a thickness that reduces continuously or discontinuously from a radially inner side toward a radially outer side or from said radially outer side toward said radially inner side,
    wherein said linking plate includes:
    a ring-shaped flat plate portion that has a constant thickness, said ring-shaped flat plate portion being disposed at an intermediate position between said mounting portion and said rotor ring;
    a radially inner curved portion that links said mounting portion and said ring-shaped flat plate portion, that has thickness that reduces or increases continuously from said radially inner side to said radially outer side so as to become equal to said thickness of said ring-shaped flat plate portion; and
    a radially outer curved portion that links said rotor ring and said ring-shaped flat plate portion, that has a thickness that increases or reduces continuously from said radially outer side to said radially inner side so as to become equal to said thickness of said ring-shaped flat plate portion.

2. The rotary electric machine according to either of claim 1, wherein said rotor boss includes:
    a radially inner part in which said mounting portion and said linking plate are formed integrally; and
    a radially outer part that is constituted by said rotor ring, said rotor boss being configured by joining said linking plate and said rotor ring by welding.

3. The rotary electric machine according to claim 1, wherein said linking plate is formed by pressing so as to have a curved shape.

4. The rotary electric machine according to claim 1, wherein:
    a positioning flange portion is formed on a second axial side of an outer circumferential surface of said rotor ring; and
    said rotor core is held so as to be fitted over said rotor ring so as to be in contact with said positioning flange portion.

5. The rotary electric machine according to claim 4, wherein only said rotor core is held by said rotor ring.

6. The rotary electric machine according to claim 4, wherein:
    an end plate is mounted so as to be fitted over said rotor ring so as to be positioned radially inside said magnet housing apertures, and so as to contact a first axial end surface of said rotor core; and said end plate and said rotor core are pressed and held between a radially outward crimping portion on a first axial end portion of said rotor ring and said positioning flange portion such that axial movement is restricted.

* * * * *